United States Patent Office 3,412,153
Patented Nov. 19, 1968

3,412,153
PROCESS FOR THE MANUFACTURE
OF AMIDE-ACETALS
Hans-Heinrich Bosshard, Binningen, and Heinrich
Zollinger, Kuesnacht, Zurich, Switzerland, assignors to Ciba Limited, Basel, Switzerland, a company of Switzerland
No Drawing. Filed Dec. 15, 1960, Ser. No. 75,943
Claims priority, application Switzerland, Dec. 18, 1959,
81,994/59
9 Claims. (Cl. 260—563)

This invention is based on the observation that amide-acetals of the general formula (1) 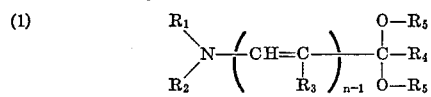

can be made in a simple manner by reacting a compound of the general formula (2) 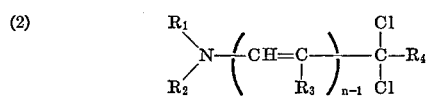

with a metal alcoholate. In the above formulae $R_1$, $R_2$, and $R_5$ each represent an alkyl, especially lower alkyl, cycloalkyl, aralkyl or aryl radical, $R_3$ and $R_4$ each represent a hydrogen atom or an alkyl, cycloalkyl, aralkyl or aryl radical, or $R_1$ and $R_2$ together with the nitrogen atom may form a heterocyclic ring or $R_2$ and $R_3$ together with the ethylene group and the nitrogen atom may form a heterocyclic ring, and $n$ is a whole number from 1 to 6.

The compounds of the Formula 1 and also those of the Formula 2 have two mesomeric limiting formulae which, in the simplest case when $n=1$, may be represented as follows:

(3) 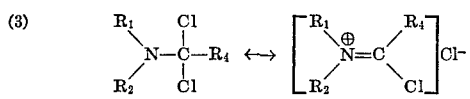

(4) 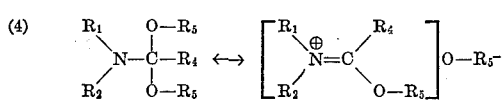

From the infra-red spectra it must be supposed that the ionic representation more closely represents the actual structure.

The amide chlorides of the Formula 2 used as starting materials can be obtained, for example, by the process described in U.S. Pat. No. 2,995,565 by reacting a compound of the Formula 5 with phosgene according to the following scheme (5)
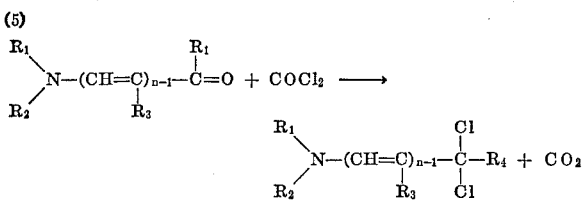

Of special interest as a starting material, owing to the ease with which it can be obtained is dichloro-dimethyl-aminomethane of the formula

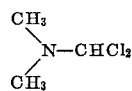

As examples of further amide chlorides there may be mentioned the compounds of the following formulae

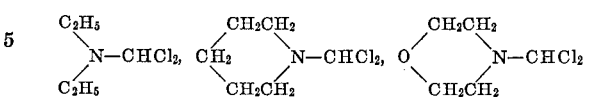

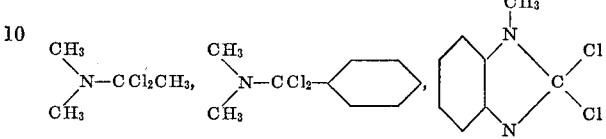

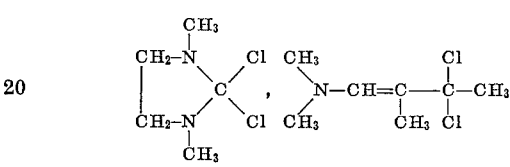

As metal alcoholates there are advantageously used alkali metal alcoholates and especially sodium alcoholates. These alcoholates are advantageously those of lower aliphatic alcohols, i.e. alcohols having at most 6 carbon atoms, for example, methanol, ethanol, isopropanol or butanol. There may also be used alcoholates of alicyclic alcohols, for example, cyclohexanol or araliphatic alcohols, for example, benzyl alcohol or phenols.

The reaction is advantageously carried in an inert organic solvent at a temperature not exceeding 20° C. As inert organic solvents there are preferably used aliphatic halogen-hydrocarbons, for example, methylene chloride, chloroform, or carbon tetrachloride. As the reaction is strongly exothermic it is of advantage to cool the reaction mixture.

Hitherto, amide-acetals of the kind obtained by the process of this invention have been made by a considerably more complicated process (see Meerwein Berichte, vol. 89, page 2060 [1956]). They are mostly distillable liquids, and owing to their reactivity they can be used in a very wide variety of reactions. Notwithstanding their reactivity they are relatively stable, and are therefore easy to handle and can be condensed, for example, with compounds containing reactive methyl or methylene groups to form methine dyestuffs.

The following examples illustrate the invention, the parts and percentages being by weight:

Example 1

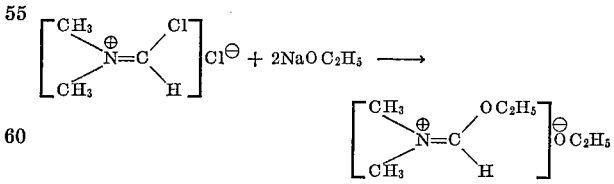

11 parts of dimethyl-formamide chloride are dissolved in 400 parts of methylene chloride, and the solution is added dropwise at 0° C. to a suspension of 12 parts of sodium ethylate in 100 parts of methylene chloride in the course of two hours, while stirring. The mixture is then stirred for a further two hours at room temperature, then filtered to remove the precipitated sodium chloride, and the filtrate is distilled. 9 parts (=71%) of dimethyl-formamide acetal distill at 140° C. under 760 mm. pressure.

Example 2

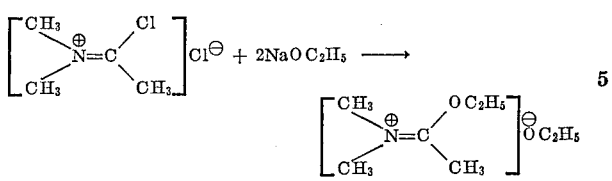

10.5 parts of dimethyl-acetamide chloride are dissolved in 300 parts of methylene chloride, and the mixture is added dropwise at 0° C. to a suspension of 11.4 parts of sodium ethylate in 100 parts of methylene chloride in the course of two hours, while stirring. The mixture is then stirred at room temperature for four hours, then the precipitated sodium chloride is filtered off and after evaporating the solvent, the filtrate is distilled under reduced pressure. Under 13 mm. pressure at 56 to 58° C. there are obtained 7.7 parts (=65%) of dimethyl-acetamide acetal.

Example 3

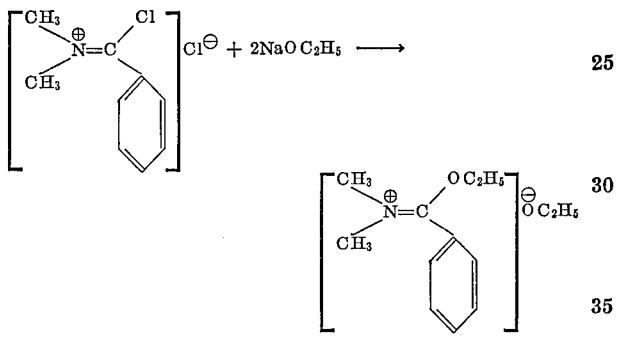

13.6 parts of dimethyl-benzamide chloride are dissolved in 300 parts of methylene chloride, and the mixture is added dropwise at 0° C. in the course of one hour to a suspension of 10 parts of sodium ethylate in 100 parts of methylene chloride, while stirring. The mixture is then stirred for 15 hours at room temperature, and then the precipitated sodium chloride is filtered off. The solvent is evaporated from the filtrate, and the residue is distilled under 13 mm. pressure. There are obtained at 115 to 119° C. 9.3 parts (=63%) of dimethyl-benzamide acetal.

Example 4

A solution of 1 part of dimethyl-benzthiazolium methyl sulfate in 4 parts of dimethyl-formamide is added dropwise at 25 to 30° C. in the course of three hours, while stirring and with the exclusion of moisture, to a mixture of 1 part of dimethyl-formamide acetal and 5 parts of methylene chloride. The reaction mixture is then stirred for 3 hours at 25 to 30° C., and is then allowed to stand at room temperature for 15 hours. The solvent is distilled off under reduced pressure at about 100° C., and the residue is crystallized once from ethyl alcohol. There is obtained in a yield of about 90% a water-soluble product of the constitution

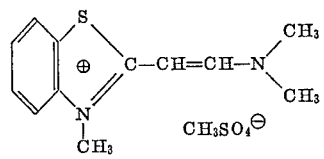

Example 5

12 parts of α-methyl-β-di-methylamino-acrolein are treated with phosgene in 100 parts of methylene chloride at 0° C. After expelling the excess of phosgene with nitrogen, the solution containing the amide chloride is mixed, while stirring, with 14 parts of sodium ethylate, and the mixture is maintained at 20° C. for 15 hours. The precipitated sodium chloride is filtered off, and the filtrate is evaporated. The product so obtained corresponds to the formula

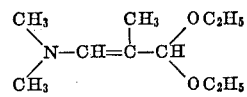

8 parts of the crude product obtained as described above are dissolved in 100 parts of methylene chloride, and the solution is slowly added dropwise, while stirring, at 20° C. to 20 parts of dimethyl-benzthiazolium chloride in 40 parts of dimethyl-formamide. The whole is then heated for 5 hours at 30° C. The precipitated blue-green pure crystalline product is filtered off. It has the constitution

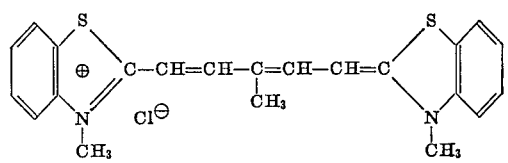

Example 6

3.5 parts of dimethyl-formamide chloride are dissolved in 70 parts of methylene chloride, and the solution is stirred with 6.4 parts of sodium phenolate first at 0 to 5° C. for 1½ hours and then at 25 to 30° C. for 5 hours. The precipitated sodium chloride is filtered off, the filtrate is freed from the solvent, and the residue is distilled at 80 to 85° C. under 0.5 mm. pressure. The distillate has the constitution

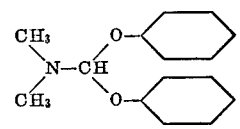

Example 7

6.2 parts of sodium cyclohexanolate are suspended in 100 parts of methylene chloride and 3.3 parts of dimethyl-formamide chloride in 50 parts of methylene chloride are added in the course of half an hour while cooling. The whole is then stirred for 15 hours at room temperature. The precipitated sodium chloride is filtered off, the solvent is expelled and the residue is purified by fractional distillation under reduced pressure. There is obtained under 11 mm. pressure a product boiling at 75 to 80° C. having the constitution

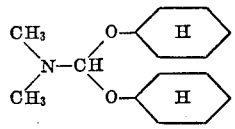

Example 8

9 parts of dimethyl-formamide chloride are dissolved in 200 parts of methylene chloride, and the solution is added at 0° C. in the course of 1½ hours, while stirring, to a suspension of 18 parts of sodium benzylate in 100 parts of methylene chloride. The whole is then further stirred for 15 hours at room temperature, the precipitated sodium chloride is filtered off, and the filtrate is concentrated and fractionally distilled under 11 mm. pressure. There is obtained a product boiling at 95 to 100° C. having the constitution

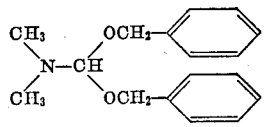

What is claimed is:

1. A process for the manufacture of a compound of the formula

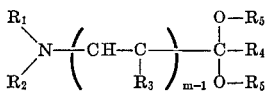

or wherein a compound of the formula

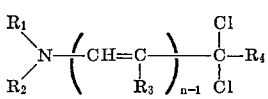

or is reacted at a temperature not exceeding 20° C. in an inert organic solvent with an alkali metal alcoholate of the formula $R_5OM$, in which $R_1$ and $R_2$ each represent lower alkyl, $R_3$ and $R_4$ each represent a member selected from the group consisting of hydrogen, lower alkyl and phenyl, $R_5$ is a member selected from the group consisting of lower alkyl, cyclohexyl, benzyl and phenyl, M is an alkali metal atom and $n$ is a positive whole number of up to 2.

2. A process as claimed in claim 1 wherein the alkali metal alcoholate is sodium ethylate.

3. A process as claimed in claim 1, wherein the compound of the formula

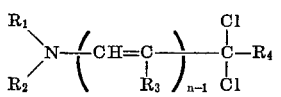

is dimethyl-formamide chloride.

4. The process which comprises reacting together, in an inert liquid organic reaction medium, an alkali metal alkoxide and 1,1-dichloroethyldimethylamine.

5. A process which comprises reacting at a temperature not exceeding 20° C. in an inert organic solvent dichlorodimethylaminomethane with two molecular proportions of sodium ethylate and recovering the product of the formula

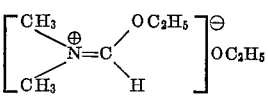

6. A process which comprises reacting at a temperature not exceeding 20° C. in an inert organic solvent the chloride of dimethyl-acetamide with two molecular proportions of sodium ethylate and recovering the product of the formula

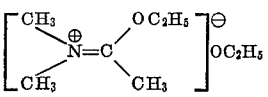

7. A process which comprises reacting at a temperature not exceeding 20° C. in an inert organic solvent the chloride of dimethylbenzamide with two molecular proportions of sodium ethylate and recovering the product of the formula

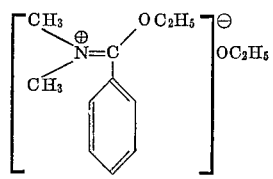

8. A process which comprises reacting at a temperature not exceeding 20° C. in an inert organic solvent the chloride of dimethyl formamide with two molecular proportions of sodium phenolate and recovering the product of the formula

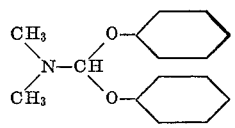

9. A process which comprises reacting at a temperature not exceeding 20° C. in an inert organic solvent the chloride of dimethyl formamide with two molecular proportions of sodium cyclohexanolate and recovering the product of the formula

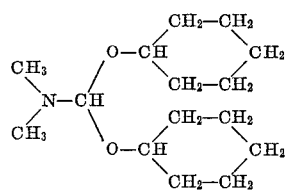

References Cited

UNITED STATES PATENTS

| | | | |
|---|---|---|---|
| 3,092,637 | 6/1963 | Brown | 260—563XR |
| 2,995,565 | 8/1961 | Jenny | 260—310 |

FOREIGN PATENTS

| | | |
|---|---|---|
| 495,020 | 1930 | Germany. |
| 573,563 | 1945 | Great Britain. |

OTHER REFERENCES

Sah et al.: Jour. Amer. Chem. Soc., vol. 54 (1932), pp. 2964—2966. Post: Chemistry of Aliphatic Orthoesters (1943) pages 14, 20. Mackenzie: J. Chem. Soc. (London), vol. of 1922, pp. 1695–1699. Kober et al.: J.A.C.S. vol. 80, pp. 5547–5551 (1958). Meerwein et al.: Ber. Deut. Chem., vol. 89, pp. 2060–2079.

FLOYD D. HIGEL, *Primary Examiner.*